Nov. 20, 1923.
A. L. BEM
TRUCK
Filed March 7, 1922
1,474,811
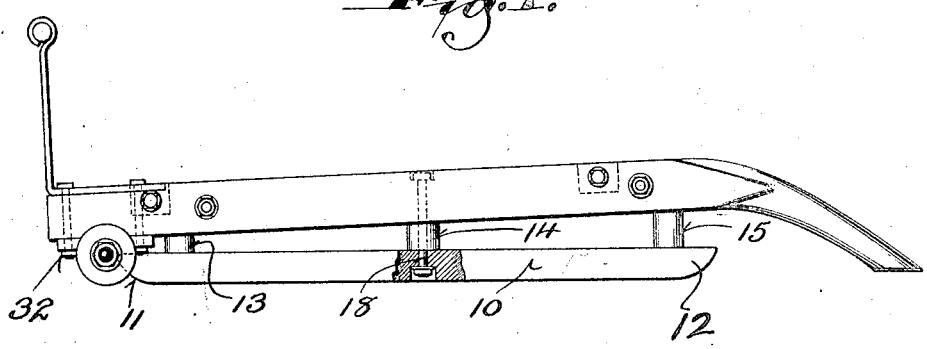
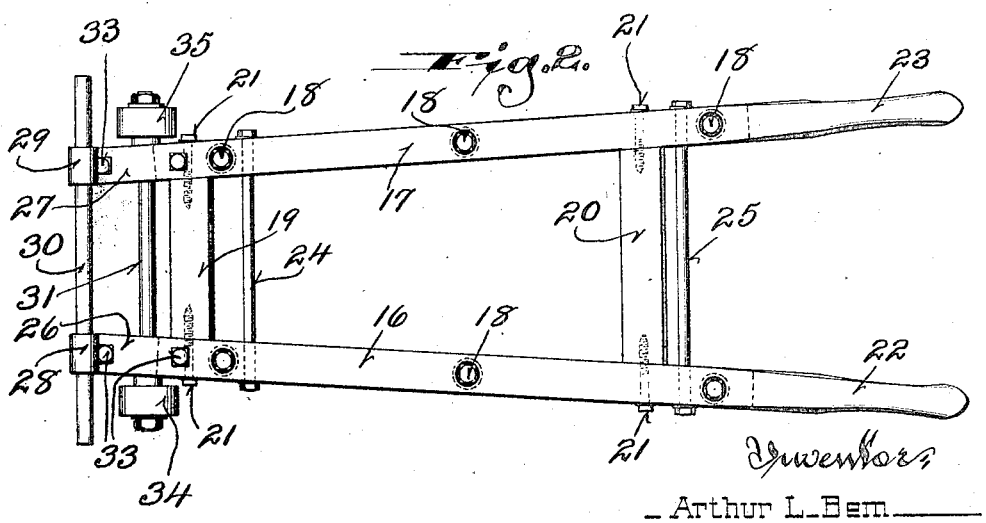
Arthur L. Bem Patented Nov. 20, 1923.

1,474,811

UNITED STATES PATENT OFFICE.

ARTHUR L. BEM, OF MANITOWOC, WISCONSIN.

TRUCK.

Application filed March 7, 1922. Serial No. 541,734.

*To all whom it may concern:*

Be it known that I, ARTHUR L. BEM, a citizen of the United States, and resident of Manitowoc, in the county of Manitowoc and State of Wisconsin, have invented certain new and useful Improvements in Trucks; and I do hereby declare that the following is a full, clear, and exact description thereof.

The invention relates to trucks designed more particularly for carrying stoves, but useful, also, for other burdens. It comprises in addition to some of the common truck features, a pair of longitudinal supports, one under each of the side frame member and rigidly secured thereto, the supports having forward ends curved upwardly, the upper surface of the truck frame being inclined downwardly in a forward direction and the handles terminating on substantially the same plane with the side supports.

A primary object of the novel structure is the provision of means for sustaining a great weight for a long period of time. The supports in this respect have an advantage over legs, which are not sufficiently braced and may be subjected to a separating or shattering action. If a heavy burden is reposed on the body for a long period, a strong structure is especially desiderate. The supports serve, also, to brace the side members, which are thus braced suitably at several points and prevented from sagging.

An additional object of the support structure is the provision of a brake which is operable merely by the lowering of the handles of the truck. This brings the supports in contact with the floor and exercises a dragging action, the slight tendency of the supports to glide preventing undue shock as the result of the brake.

In designing the construction, the inventor has in mind smoothness of operation. The lifting of the handles of the truck about the pivotal support on the wheels is effected without any jar. If the wheels were positioned considerably above the supports, the weight would have to be swung about the supports in such a manner as to bring the wheels down in contact with the floor. This would tend to damage the articles carried.

A feature of the supports is the upwardly curved ends thereof, which are adapted to pass over obstructions, danger of catching thereon being eliminated. If the end of the support should contact with an obstruction, the curved surface is enabled to ride over it readily.

A feature of the device is the termination of the handles in substantially the same plane as the bottom of the supports, the frame being inclined forwardly. An operator is thus enabled to throw the center of gravity of the load forwardly more nearly above the wheels. This takes a part of the weight from the hands of the operator.

With the above and other objects in view which will appear as the description proceeds, my invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing, I have illustrated one complete example of the physical embodiment of the present invention constructed according to the best mode I have so far devised for the practical application of the principles thereof, and in which:

Figure 1 is a side elevation of the truck, and

Figure 2 is a plan thereof.

Supports 10 are curved upwardly at their forward ends 11 and at their rearward ends 12, and by means of blocks 13, 14, and 15 are spaced from side frame pieces 16 and 17. Bolts 18 serve to secure the support blocks and side frame pieces rigidly together. Side frame pieces 16 and 17 are inclined downwardly in a forward direction and are spaced apart forwardly by transverse frame piece 19 and rearwardly by wider transverse frame piece 20, the transverse pieces being secured to the longitudinal frame pieces by bolts 21. The brace rods 24 and 25 exert tension in an inward direction on the side frame members and operate to strengthen the parts. Handles 22 and 23 integral with side frame pieces 16 and 17 are downwardly directed and terminate in substantially the same plane with the lower surface of side supports 10.

Brackets 26 and 27 have eyes 28 and 29 receiving bar 30 for well-known purposes. Shaft 31 is carried by a bearing strap 32 on either side, the strap, side frame pieces, and brackets being secured together by bolts 33.

When the operator lifts up on handles 22 and 23, the center of gravity of the load is thrown forwardly nearing the vertical line running through the wheels 34 and 35 carried on shaft 31. Obviously, the forwardly inclined surface of the frame assists in advancing the weight of the load. When it is desired to retard the movement of the truck, supports 10 are moved in contact with the floor and exercise a dragging action. The supports are of such nature that there is no tendency for blocks 13, 14, and 15 to be bent or broken and considerable weight may be imposed for a long period on side frame members 16 and 17, because of the plural points of support therefor on blocks 13, 14, and 15.

I claim:—

The combination of side frame members, wheels therefor, adjacent the ends thereof, means for securing said wheels thereto, a pair of elongated supports, a plurality of spacer blocks on said supports, and bolts extending through said supports, said spacer blocks and said side members securing said supports, said side frame members and said spacer blocks together, said supports approaching said side frame members in the direction of said wheels and said side frame members being inclined when said supports are horizontal.

In testimony that I claim the foregoing I have hereunto set my hand at Manitowoc, in the county of Manitowoc and State of Wisconsin.

ARTHUR L. BEM.